Oct. 31, 1950  I. WOLFF  2,528,202
RADIO NAVIGATION SYSTEM
Filed Aug. 30, 1945  3 Sheets-Sheet 1
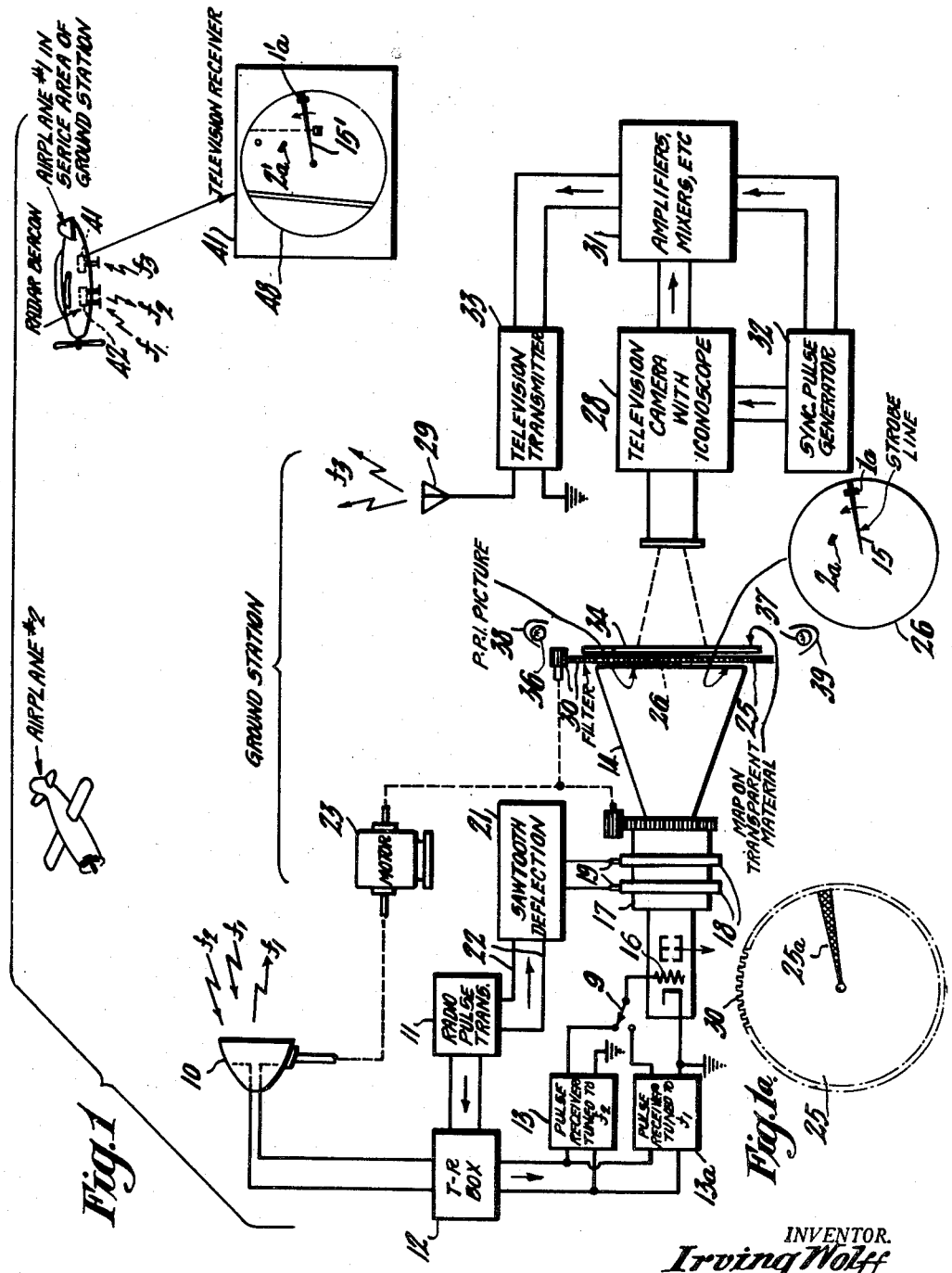
INVENTOR.
Irving Wolff
BY 
ATTORNEY

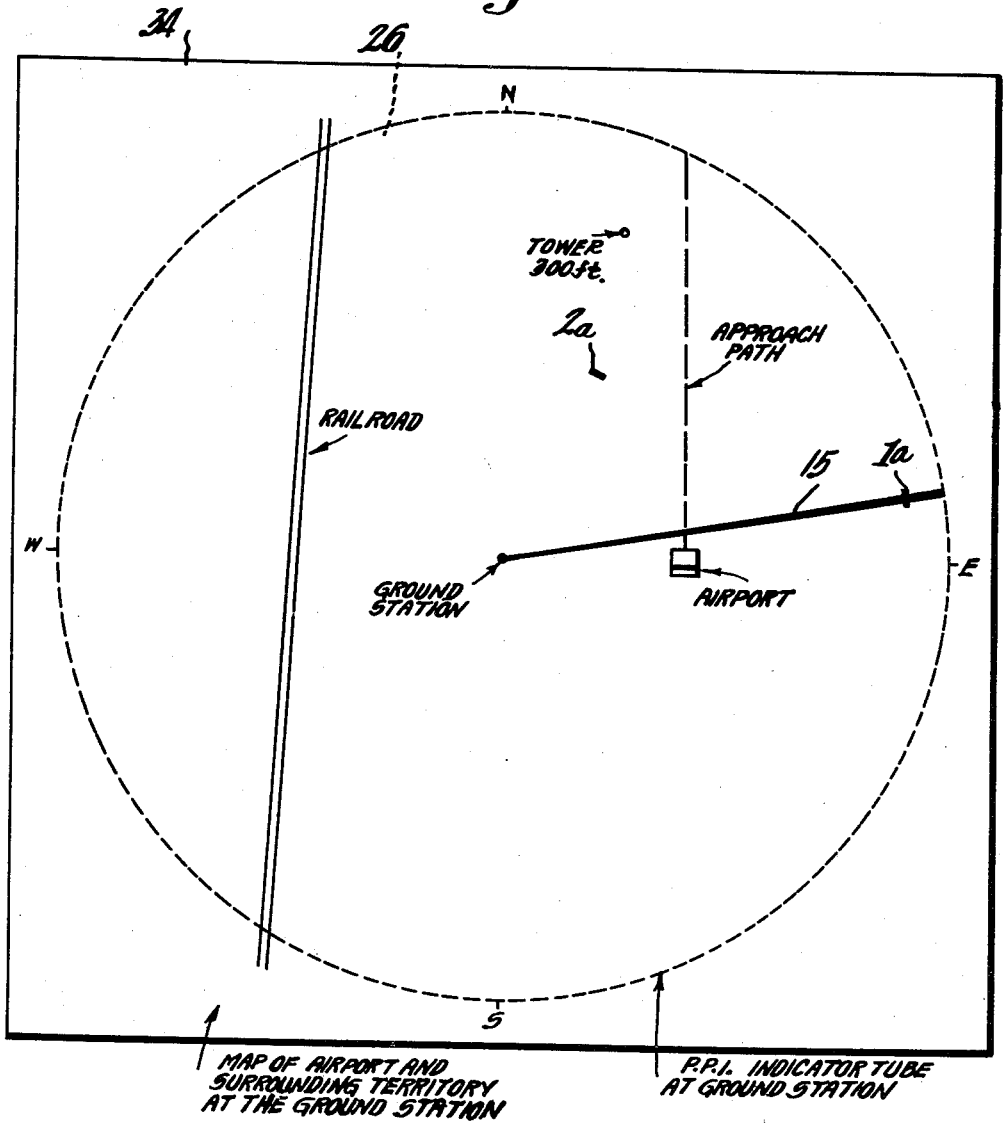

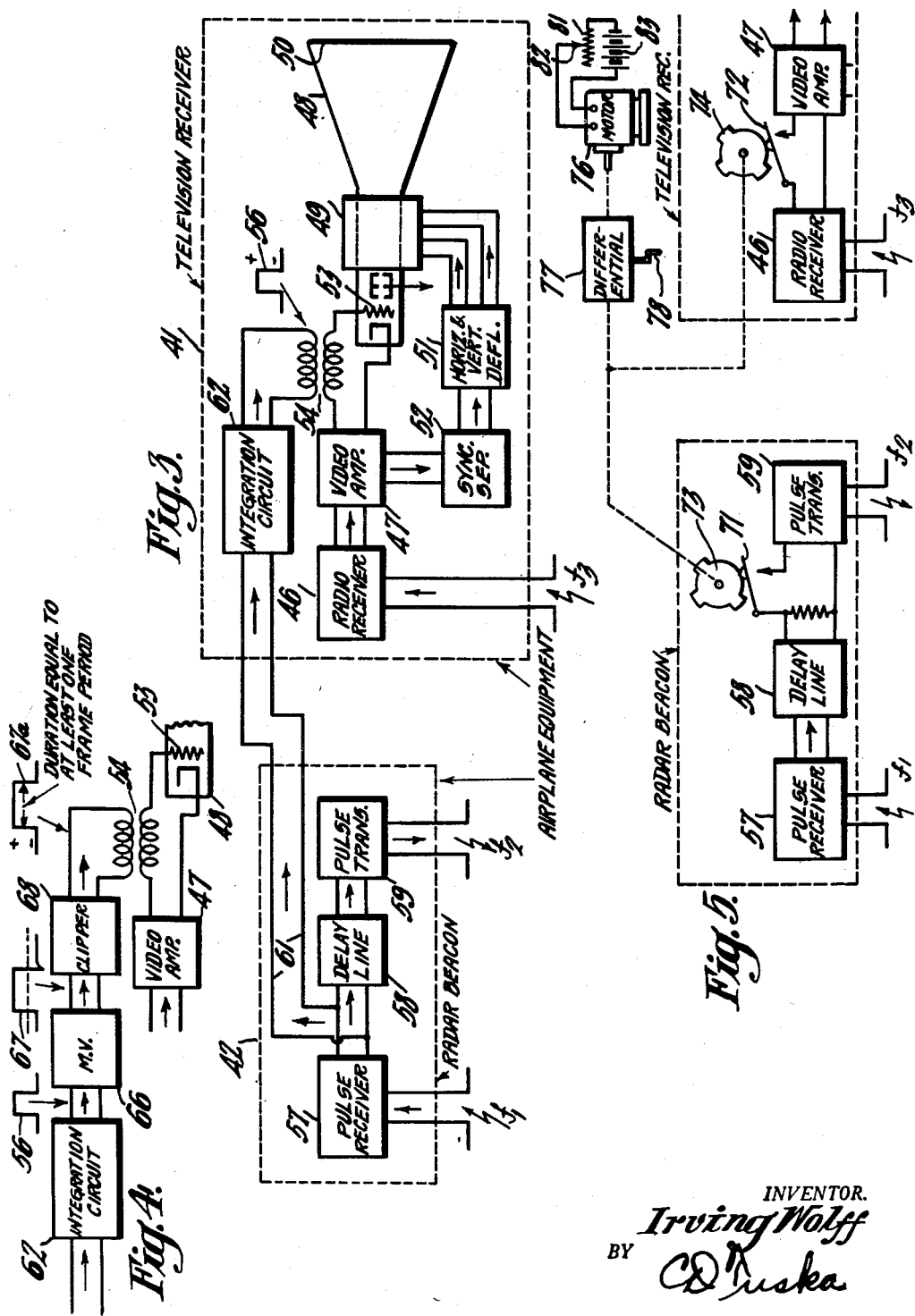

Patented Oct. 31, 1950

2,528,202

UNITED STATES PATENT OFFICE 2,528,202

RADIO NAVIGATION SYSTEM

Irving Wolff, Princeton, N. J., assignor to Radio Corporation of America, a corporation of Delaware Application August 30, 1945, Serial No. 613,509

15 Claims. (Cl. 343—7)

My invention relates to radio navigation systems and particularly to systems for ship or aircraft navigation wherein the ship or aircraft receives information from a radar system on the ground.

In a copending application Serial No. 607,999½, filed July 31, 1945 in the name of Loren F. Jones and entitled Radio Navigation System there is described and claimed a navigation system for ships or aircraft which comprises a radar system such as a Plan Position Indicator system (P. P. I. system) on the ground and a television transmitter for transmitting the P. P. I. view of craft within the service area of the P. P. I. and television stations to said craft. Each ship or aircraft carries a television receiver and preferably a radar beacon, also. Preferably, a map superimposed on the P. P. I. view is transmitted also by the television transmitter.

An object of the present invention is to provide an improved radio navigational system of the above-described type.

A further object of the invention is to provide a combined radar and television navigation system having improved means for identifying in a P. P. I. or other radar picture the particular craft that is receiving said picture.

A still further object of the invention is to provide an improved method of and means for identifying in a P. P. I. picture or the like being received at a ship or aircraft the said craft receiving the picture.

In practicing one embodiment of the invention the ground station comprises a P. P. I. system which radiates radio pulses from a directional antenna that is continuously rotated through 360 degrees to search for aircraft in the vicinity. A cathode ray indicator tube is provided with a deflecting yoke that is rotated in synchronism with the antenna, and the cathode ray is simultaneously deflected radially at a comparatively rapid rate in synchronishm with the pulse transmission. Radio pulses reflected from said aircraft are picked up by said antenna and caused to modulate the cathode ray. Thus there appears on the cathode ray screen a view wherein a spot on the screen corresponds to a particular aircraft, and wherein the aircraft's position with respect to the P. P. I. antenna is shown.

This view is transmitted by a television transmitter so that it may be received by any aircraft within the service area that is equipped with a television receiver. Since the P. P. I. picture may show a plurality of aircraft in the service area, some way must be provided to show a pilot or navigator which one of the spots in the picture is the one corresponding to his airplane.

One way of accomplishing this, according to the present invention, is to receive the transmitted radio pulses at the aircraft as the narrow radio beam sweeps past the aircraft and to apply these pulses, preferably after integrating them so that they appear as a single wide pulse, to the control grid of the television receiver cathode ray tube to increase the cathode ray intensity. As a result, during this short period, the received P. P. I. picture brightens up. At this time a rotating strobe or marker line, described below, is pointing to the spot corresponding to the aircraft being swept by the radio beam whereby the desired indication is obtained.

It is apparent that the above method of identification depends upon the fact that there is a marker line which rotates with the deflecting yoke and the P. P. I. antenna. This marker line is referred to as the strobe or strobe line. Such a strobe line normally is present in the picture produced by a conventional P. P. I. system because of noise signal, unless the receiver gain is turned down too low, and it can always be made visible by turning up the receiver gain.

The fact that there is a rotating strobe line is also a result of the fact that the time lag or persistence characteristic (light intensity vs. time) of the phosphorescent material comprising the P. P. I. screen drops rapidly and then flattens out. For P. P. I. systems a phosphorescent material having long persistence is selected so that a spot caused by reflection from an aircraft will remain visible on the screen during a complete scan or rotation of the P. P. I. antenna and deflecting yoke. Thus all reflecting objects swept by the radio beam during one scan are visible simultaneously on the screen.

Because of the above-mentioned persistence characteristic, the cathode ray trace on the screen is substantially brighter immediately after being scanned by the cathode ray than it is a little later. Thus, the radial line being scanned together with one or two immediately preceding radial lines appears as a bright strobe line on a P. P. I. picture of less brightness. As the radio beam and the deflecting yoke of the P. P. I. system are rotaated, the strobe line rotates with them.

According to another embodiment of the invention, the desired identification is obtained at an aircraft carrying both a radar beacon and a television receiver by keying the beacon and television receiver in synchronism at a comparatively slow rate, such as four times per second. Assuming that the P. P. I. picture at the ground station is one obtained from beacon retransmission only, not from direct reflections or echoes, then on the said aircraft the only spot in the P. P. I. picture that is not flickering or fading in and out is the spot corresponding to said aircraft where the beacon transmission and the television reception are in synchronism.

The invention will be better understood from the following description taken in connection with the accompanying drawing in which Figure 1 is a block diagram illustrating one embodiment of the invention, Figure 1a is a view of an optical filter that is employed in the system of Fig. 1, Figure 2 is a view of a portion of the system shown in Fig. 1 wherein a map is superimposed on a P. P. I. view, Figure 3 is a block diagram of a system that may be carried by an aircraft which is to use the ground station of Fig. 1 for navigation, Figure 4 is a block diagram showing a modification of the apparatus shown in Fig. 3, and Figure 5 is a block diagram showing another embodiment of the invention that enables a pilot to identify his own aircraft in a P. P. I. picture transmitted from a ground station such as that shown in Fig. 1.

In the several figures similar parts are indicated by similar reference characters.

Referring to Fig. 1, the ground station comprises a radar system of the P. P. I. type which includes a rotatable directive antenna 10, a radio pulse transmitter 11 which is coupled to the antenna 10 through a transmit-receive or T-R box 12 that functions as an antenna duplexer as is well known in the art. Reflected or retransmitted pulses are received by the antenna 10 and supplied through the T-R box 12 to two radio pulse receivers 13 and 13a.

The cathode ray indicator tube 14 may be of conventional design having a control grid 16 to which pulses from either the receiver 13 or the receiver 13a are applied. The cathode ray is deflected radially by means of a deflecting yoke 17 comprising a pair of deflecting coils and provided with conductor rings 18 and brushes 19 whereby the yoke 17 may be rotated during the radial deflection. A sawtooth deflecting wave is supplied to the deflecting yoke 17 from a sawtooth deflection circuit 21 which is synchronized with the pulse transmission by means of pulses supplied over conductors 22.

A motor 23 is mechanically coupled to the antenna 10 and to the yoke 17 for rotating them in synchronism at some slow rate such as one rotation every six seconds.

The cathode ray tube 14 is provided with a phosphorescent screen 26 having long persistence. Light spots appear on the screen 26, as shown at 1a and 2a, which correspond to the aircraft that reflect or retransmit the radio pulses. Two such aircraft, which are indicated as airplane No. 1 and airplane No. 2, are illustrated. Also, a rotating strobe or marker line 15 appears on the screen. The spot 1a in the P. P. I. picture corresponds to airplane No. 1, the distance of the spot from the center of the picture showing the distance from the radar station to the airplane No. 1, and the angular position of the spot showing the azimuth of the airplane with respect to the radar station. Similarly, the spot 2a corresponds to the airplane No. 2.

The P. P. I. picture on the screen 26 is picked up by a television camera 28 and is transmitted from an antenna 29 which, in the present example, is non-directive. The television transmitting system is of conventional design and comprises, in addition to the television camera 28, suitable amplifiers and mixers indicated at 31, a synchronizing pulse generator 32 that supplies synchronizing signal to the horizontal and vertical deflecting circuits of the camera 28 and to the amplifiers and mixers 31, and a radio transmitter 33 that transmits a carrier wave modulated by the usual mixture of picture and synchronizing signals.

It may be noted that the television transmitter antenna 29 may be made directive to increase the television range. In this case the antenna is rotated like the P. P. I. antenna 10 to scan the service area, and the television receiver phosphorescent screen is made of long persistence material.

A map 34 of the territory surrounding the ground station preferably is superimposed on the P. P. I. picture and transmitted therewith. The map may be drawn on transparent material and suitably illuminated as by means of lamps 36 and 37 which are provided with reflectors 38 and 39, respectively.

It may be desirable to position a rotatable optical filter 25 in front of the screen 26 for the purpose of reducing the intensity of the marker line illumination as compared with the spot illumination whereby the spots (representing aircraft) will show up more clearly in the received television picture. As shown in Fig. 1a, the filter 26 consists of a disc of transparent material which has a narrow sector 25a thereof that is darkened to have less light transmitting ability. The darkened sector 25a is positioned in front of the marker line 15 and is rotated in synchronism with it by suitable means such as gears 30 coupled to the motor 23. One of the gears 30 may be cut in the periphery of the filter disc 25.

Fig. 2 shows one example of a map superimposed on a P. P. I. picture, and it is assumed that it is this combined picture that is received by the television receivers in airplanes No. 1 and No. 2 (Fig. 1). In the example assumed, the diameter of the P. P. I. picture corresponds to about 30 miles. The ground station is located about 6 miles west of an airport and is used, in the example being described, to enable pilots to bring their aircraft to the airport after they have reached its general vicinity by the aid of other navigation equipment. If a blind landing is to be made, other equipment for this purpose should be provided.

It will be understood that the type of system being described may be employed for cross-country navigation to aid pilots in reaching the vicinity of the desired airport. For this use it is desirable to employ radar and television transmitters of greater power, of sufficient power, for example, to service an area having a 50 mile radius.

Referring now to the aircraft equipment, each aircraft is provided, as indicated at airplane No. 1 (Fig. 1), with a television receiver 41 and preferably is also provided with a radar beacon 42. This equipment is shown in more detail in Fig. 3 and will be described with reference to Fig. 3 hereinafter. As illustrated in Fig. 1, the airplane No. 1 (as well as airplane No. 2 and others suitably equipped) receives a picture that is a duplicate of the combined P. P. I. and map view shown in Fig. 2. The spots 1'a and 2'a in the received picture correspond to the spots 1a and 2a on the P. P. I. screen 26 and the strobe line 15' corresponds to the strobe line 15. Therefore, the pilot of airplane No. 1 can see his location with respect to the airport and with respect to anything else shown on the map, providing he can determine what spot in the P. P. I. picture corresponds to his airplane No. 1. Two ways of obtaining such aircraft identification will now be described.

Referring to Fig. 3, the television receiver 41 is of conventional design and comprises a radio receiver portion 46, a video frequency amplifier 47, and a cathode ray tube 48. The tube 48 has a screen 50 of phosphorescent material that has short persistence the same as in the usual television receiver. Sawtooth waves for horizontal and vertical deflection are supplied to a deflecting yoke 49 from deflecting circuits indicated at 51. The deflection circuits 51 are synchronized by synchronizing pulses supplied from a synchronizing pulse separating circuit 52.

The video amplifier output is applied to the control grid 53 of the cathode ray tube 48, the secondary of a transformer 54 being included in the circuit in the example illustrated. The transformer 54 is provided for applying a positive pulse 56 to the grid 53 for identification purposes as explained hereinafter. It will be understood that the pulse 56 may be applied to the grid 53 by other circuit means than the transformer 54 if desired.

The radar beacon 42 comprises a radio pulse receiver 57 which receives and demodulates the radar pulses transmitted from the ground station on a carrier wave frequency $f_1$. The demodulated pulses may be applied through a delay line or network 58 to a radio pulse transmitter 59 operating on a carrier wave frequency $f_2$. The delayed pulses modulate the transmitter 59 whereby the received pulses are retransmitted at the carrier frequency $f_2$. Both the delay introduced by the network 58 and the difference in the frequencies $f_1$ and $f_2$ are utilized to prevent "singing" of the beacon circuit.

Since the use of a delay network 58 makes it advisable to provide at the ground radar receiver a delay correction such as a corresponding delay in the start of the sawtooth wave being applied to the deflecting yoke, it may be preferred to omit the delay network 58 and substitute other means for minimizing the tendency of the beacon to "sing." For example, suitable means may be provided for blocking the receiver 57 immediately after the reception of a pulse and to unblock it before the next pulse is received.

In accordance with a preferred embodiment of the invention, the demodulated pulses from the beacon receiver 57 are also applied through conductors 61 to an integration circuit 62 whereby the integrated pulse 56 is obtained. The pulse 56 is the integrated energy of the group of radar pulses that appear in the output of the receiver 57 during the interval that the P. P. I. radio beam sweeps past the aircraft No. 1 carrying said receiver. The integrated pulse 56 is applied through the transformer 54 to the control grid 53 of the cathode ray tube with positive polarity. As a result, the electron beam intensity is increased while the pulse 56 is on the grid 53. This, of course, is also the time the beacon transmitter 59 is retransmitting and/or reflecting pulses to the P. P. I. ground station to produce a spot on the P. P. I. picture corresponding to the aircraft No. 1 carrying said beacon; it is also the time that the rotating marker or strobe line 15 is pointing to the spot corresponding to the aircraft No. 1. It follows that the pulse 56 causes the P. P. I. picture on the tube 48 to brighten up only while the strobe line is pointing to the spot corresponding to the aircraft No. 1 whereby the pilot can readily identify his own aircraft.

In practicing the invention it is not essential that the aircraft be equipped with radar beacons or retransmitters since the P. P. I. picture may be obtained by pulses reflected from the surface of the aircraft, and since only a radio receiver is required on the aircraft for obtaining the identification pulse 56.

As shown in Fig. 1, two receivers 13 and 13a may be provided which are tuned to the beacon transmitter frequency $f_2$ and to the radar transmitter frequency $f_1$, respectively. By means of a switch 9, the cathode ray tube 14 may be connected to the receiver 13 when it is desired to obtain a P. P. I. picture that is produced by the radar beacons, or it may be connected to the receiver 13a when it is desired to obtain a P. P. I. picture that is produced by direct reflection of the radar pulses.

When using the circuit of Fig. 3, only part of the picture will be brightened by the pulse 56 if the radio beam from the P. P. I. antenna is so narrow and is being rotated so fast so that it sweeps past an aircraft too rapidly to produce a pulse 56 having a duration equal to that of at least one picture frame.

Fig. 4 shows a modification of the circuit shown in Fig. 3 wherein means is provided to insure that the identification pulse applied to the control grid 53 will last at least for the duration of one complete scan or frame of the television picture. While an identification pulse of this duration is not essential for obtaining identification it is more desirable to have the complete picture brighten than to have only a fractional part of the picture such as the upper third, brighten.

In Fig. 4, the pulse 56 triggers a multivibrator 66 which produces a rectangular wave having a pulse portion 67 of the desired duration. The rectangular wave may be passed through a clipper circuit 68 to produce a good rectangular pulse 67a which is applied to the cathode ray tube grid 53 through the transformer 54. Thus, the pulse 67a will always brighten the entire television picture regardless of the duration of the triggering pulse 56.

Fig. 5 shows apparatus for obtaining identification according to the method of keying the beacon transmitter and the television receiver in synchronism whereby the only steady or non-flickering spot in the P. P. I. picture is the one corresponding to the aircraft carrying this apparatus. In the radar beacon and in the television receiver, switches 71 and 72, respectively, are closed and opened in synchronism by means of cams 73 and 74, respectively. The cams 73 and 74 are rotated by a motor 76. The cams 73 and 74 may be driven through a differential gear unit 77 so that the phase relation of the rotating cams 73 and 74 may be changed with respect to the beacon keying on other craft by operating a crank 78 on the differential unit. This might be desirable in the event that the keying or switching motor on another craft happened to be running at the same speed as motor 76 and also happened to be keying the beacon and television receiver in synchronism with the keying by the switches 71 and 72.

Instead of employing the differential unit 77 to distinguish between two craft that happen to have their switching motors running at the same speed and switching the equipment of the two crafts in synchronism, suitable means may be employed to change the speed of the switching motor 76. In the example shown, the speed control means is a resistor 81 with a variable tap 82 connected between the motor 76 and its power supply 83.

The identification method of Fig. 5 is most useful in systems wherein the radio beam scans rapidly as, for example, at the rate of 20 scans per second, and wherein the phosphorescent screen of the indicator tube at the ground station has a correspondingly short persistence. One preferred way of operating the system is to operate the switches 71 and 72 at a rate such that the radio beam makes several scans while the switches 71 and 72 are closed. For example, the switches 71 and 72 may be closed at a rate of about 4 times per second in the example assumed. As in the example given, the switching rate should not be close to the radio beam or antenna scanning rate as otherwise undesired beat effects between the two rates may be obtained.

It will be apparent that if other aircraft are also provided with the identification system of Fig. 5, their beacon transmitters will have their keying switches open during some of the periods that the receiver switch 72 of the plane to be identified is closed. As a result, the signal for the spots corresponding to these other aircraft will be supplied to the video amplifier 47 at a rate less than that of the operation of switch 72 and the said spots will flicker. On the other hand, the signal for the spot corresponding to the aircraft to be identified will be applied to the video amplifier 47 each time the switch 72 is closed and the said spot will be steady, thus identifying the aircraft.

While the invention has been described as applied to a P. P. I. system which scans through 360 degrees, it should be understood that the invention is not so limited and may be applied to a system employing sector scanning, i. e., to one which scans through less than 360 degrees.

I claim as my invention:

1. A navigation system for craft within the service area of a ground station, said system comprising a ground station which includes a radar system for obtaining the distance and angular position of each of said craft and which further includes means for transmitting said distance and angular position information to said craft, said radar system including means for scanning said service area by a directional radio beam, means for obtaining a marker line that moves in synchronism with said radio beam, receiving means carried by each of said craft for receiving said distance and angular position information, means carried by each of said craft for reproducing said marker line and said distance and angular position information as a picture having spots therein showing the positions of said craft, and means for identifying at a craft the spot in said picture which corresponds to said last-mentioned craft, said last means comprising means for producing an indication in response to said radio beam pointing toward said last-mentioned craft whereby said marker line is pointing to said last-mentioned spot at the moment said indication is produced.

2. A navigation system for craft within the service area of a ground station, said system comprising a ground station which includes a radar system for obtaining the distance and angular position of each of said craft and which further includes means for transmitting said distance and angular position information to said craft, said radar system including means for scanning said service area by a directional radio beam, television transmitting means for also transmitting to said craft signals representing a map of at least a portion of said service area and a marker line that moves in synchronism with said radio beam, receiving means carried by each of said craft for receiving said television signals representing said map and said marker line and said distance angular position information, means carried by each of said craft for reproducing said map, said marker line and said distance and angular position information as a picture having spots superimposed on said map showing the positions of said craft on said map, and means for identifying at a craft the spot in said picture which corresponds to said last-mentioned craft, said last means comprising means for producing an indication in response to said radio beam pointing toward said last-mentioned craft whereby said marker line is pointing to said last-mentioned spot at the moment said indication is produced.

3. A navigation system for craft within the service area of a ground station, said system comprising a ground station which includes a radar system for obtaining the distance and angular position of each of said craft and which further includes means for transmitting said distance and angular position information to said craft, said radar system including means for scanning said service area by a directional radio beam, television transmitting means for also transmitting to said craft a signal representing a map of at least a portion of said service area and a marker line that moves in synchronism with said radio beam, receiving means carried by each of said craft for receiving said signals representing said map and said marker line and said distance and angular position information, means carried by each of said craft for reproducing said map, said marker line and said distance and angular position information as a picture having spots superimposed on said map showing the positions of said craft on said map, and means for identifying at a craft the spot in said picture which corresponds to said last-mentioned craft, said last means comprising means for momentarily changing the brightness of said picture in response to said radio beam pointing toward said last-mentioned craft whereby said marker line is pointed to said last-mentioned spot at the moment of changed picture brightness.

4. A navigation system for craft within the service area of a ground station, said system comprising a ground station which includes a radar system of the plan position indicator type for obtaining information representative of the distance and angular position of said craft and which further includes means for retransmitting said information to said craft, said ground station also including means for transmitting map information to said craft, said radar system including means for scanning said service area by a directional radio beam, said radar system also including means for producing and transmitting signals representative of a marker line which moves in synchronism with the motion of said radio beam, a receiving means carried by each of said craft for receiving from said radar system said retransmitted signals, said map information and said marker line signals, and for reproducing a picture representative of said map and said marker line and containing spots located in accordance with said signals representative of said distance and angular position whereby said spots show the positions of said craft, means for producing an electrical pulse in the output of said receiving means in response to said radio beam being directed toward the craft carrying said receiver, and means for changing the brightness of said reproduced picture in response to the production of said electrical pulse whereby the marker line in said received picture is pointing to the spot corresponding to said last-mentioned craft at the instant said picture changes in brightness.

5. The invention according to claim 4 wherein said last means includes means for producing in response to the occurrence of the first electrical pulse a second electrical pulse having a duration at least equal to that of one frame of said reproduced picture.

6. A navigation system for craft within the service area of a ground station, said system comprising a ground station which includes a radar system of the plan position indicator type for producing a picture of said craft and which further includes a television transmitter for transmitting said picture to said craft, said radar system including means for scanning said service area by a directional radio beam, said radar system also including means for producing in said picture a marker line which moves in synchronism with the motion of said radio beam, a television receiver carried by each of said craft for receiving said picture and a radio receiver also carried by each of said craft for receiving signals transmitted by said radar system, means for producing an electrical pulse in the output of said radio receiver in response to said radio beam being directed toward the aircraft carrying said receiver, and means for changing momentarily the brightness of the received television picture in response to the production of said electrical pulse whereby the marker line in said received picture is pointing to the spot corresponding to said last-mentioned aircraft at the instant said picture changes in brightness.

7. The invention according to claim 6 wherein said last means includes means for producing in response to the occurrence of the first electrical pulse a second electrical pulse having a duration at least equal to that of one frame of said reproduced picture.

8. A navigation system for craft within the service area of a ground station, said system comprising a ground station which includes a radar system for obtaining the distance and angular position of each of said craft and which further includes means for transmitting said distance and angular position information to said craft, a radar beacon carried by each of said craft, said beacon comprising means for receiving signals from said ground radar system and means for retransmitting said signals, receiving means carried by each of said craft for receiving said distance and angular position information, means carried by each of said craft for reproducing said distance and angular position information as a picture having spots therein showing the positions of said craft, and means for identifying at a craft the spot in said picture which corresponds to said last-mentioned craft, said last means including means for keying the beacon and the receiving means at each craft in synchronism with each other so that the receiving means is in condition to receive at the same time that the beacon is in condition to retransmit whereby the spot corresponding to said last-mentioned craft is steady and the spots corresponding to the other craft are flickering.

9. A navigation system for craft within the service area of a ground station, said system comprising a ground station which includes a radar system for obtaining the distance and angular position of each of said craft and which further includes means for transmitting said distance and angular position information to said craft, said radar system including means for scanning said service area by a directional radio beam, a radar beacon carried by each of said craft, said beacon comprising means for receiving signals from said ground radar system and means for retransmitting said signals, receiving means carried by each of said craft for receiving said distance and angular position information, means carried by each of said craft for reproducing said distance and angular position information as a picture having spots therein showing the positions of said craft, and means for identifying at a craft the spot in said picture which corresponds to said last-mentioned craft, said last means including means for keying the beacon and the receiving means at each craft in synchronism with each other so that the receiving means is in condition to receive at the same time that the beacon is in condition to retransmit and at a keying rate that is slow compared with the scanning rate of said radio beam whereby the spot corresponding to said last-mentioned craft is steady and the spots corresponding to the other craft are flickering.

10. A navigation system for craft within the service area of a ground station, said system comprising a ground station which includes a radar system for obtaining the distance and angular position of each of said craft and which further includes means for transmitting said distance and angular position information to said craft, means at said ground station for reproducing said distance and angular position information as a picture having spots therein showing the positions of said craft, television transmitting means for transmitting said picture to said craft, a radar beacon carried by each of said craft, said beacon comprising means for receiving signals from said ground radar system and means for retransmitting said signals, television receiving means carried by each of said craft for receiving said picture, and means for identifying at a craft the spot in said picture which corresponds to said last-mentioned craft, said last means including means for keying the beacon and the television receiving means at each craft in synchronism with each other so that the television receiving means is in condition to receive at the same time that the beacon is in condition to retransmit whereby the spot corresponding to said last-mentioned craft is steady and the spots corresponding to the other craft are flickering.

11. The method of supplying navigation information to craft within the service area of a ground station which comprises transmitting radio pulses in a directional beam from said station and receiving the resulting echo pulses from said craft, scanning said service area by said directional beam whereby information as to both angular position and distance of said craft is obtained at said ground station, transmitting said information to said craft, receiving said information at each of said craft and producing a picture in accordance with said information which has spots therein showing the positions of said craft and which has a marker line therein which moves in synchronism with said directional beam, and producing an indication at a craft in response to said directional beam pointing toward said last-mentioned craft whereby said marker line is pointing to the spot corresponding to said last-mentioned craft at the moment said indication is produced.

12. The method of craft identification in a navigation system wherein information is supplied to craft within the service area of a ground station of the type comprising means for transmitting radio pulses in a directional beam from said ground station and means for receiving the resulting echo pulses from said craft, and further comprising means for scanning said service area by said directional beam whereby information as to both angular position and distance of said craft is obtained at said ground station, and further comprising means for transmitting said information to said craft, said method comprising receiving said information at each of said craft and producing a picture at each of said craft in accordance with said information which picture has spots therein showing the positions of said craft, producing a marker line in the picture at each of said craft which moves in synchronism with said directional beam, and producing an indication at a craft in response to said directional beam pointing toward said last-mentioned craft whereby said marker line is pointing to the spot corresponding to said last-mentioned craft at the moment said indication is produced.

13. Craft equipment for use in a navigation system of the type comprising a ground station which includes a radar system for obtaining the distance and angular position of the craft within the service area of the ground station and which further includes means for transmitting said distance and angular position information to said craft, said radar system including means for scanning said service area by a directional radio beam, said ground station also including means for transmitting to said craft a signal representing a marker line which moves in synchronism with said radio beam, said craft equipment comprising receiving means for receiving said distance and angular position information and further comprising means for reproducing said distance and angular position information as a picture having spots therein showing the positions of said craft with respect to said ground station and for also reproducing said marker line in said picture, and further comprising means for identifying at a craft carrying said equipment the spot in said picture which corresponds to said last-mentioned craft, said last means including means for producing an indication in response to said radio beam pointing toward said last-mentioned craft whereby said marker line is pointing to the spot corresponding to said last-mentioned craft at the moment said indication is produced.

14. Craft equipment for use in a navigation system of the type comprising a ground station which includes a radar system for obtaining the distance and angular position of the craft within the service area of the ground station and which further includes means for transmitting said distance and angular position information to said craft, said radar system including means for scanning said service area by a directional radio beam, said ground station also including means for televising to said craft a marker line which moves in synchronism with said radio beam, said craft equipment comprising receiving means for receiving said distance and angular position information and further comprising means for reproducing said distance and angular position information as a picture having spots therein showing the positions of said craft with respect to said ground station and for also reproducing said marker line in said picture, and further comprising means for identifying at a craft carrying said equipment the spot in said picture which corresponds to said last-mentioned craft, said last means including means for momentarily changing the brightness of said picture in response to said radio beam pointing toward said last-mentioned craft whereby said marker line is pointing to the spot corresponding to said last-mentioned craft at the moment said brightness is changed.

15. The method of craft identification in a navigation system wherein information is supplied to craft each carrying a radar beacon and a television receiver, said craft being within the service area of a ground station of the type comprising means for transmitting radio pulses in a directional beam from said ground station and for receiving the resulting pulses retransmitted from the radar beacons on said craft and also comprising means for scanning said service area by said directional beam whereby information as to both angular position and distance of said craft is obtained at said ground station, said ground station being of the type also comprising means for transmitting said angular position and distance information to said craft, said method comprising receiving said information at a different periodic rate at each of said craft, each periodic receiving rate being too high to introduce flicker in a display of the information on a picture tube in the craft and being lower than the repetition rate of the radar pulses, producing a picture at each of said craft in accordance with said information which picture has spots therein showing the positions of said craft, and retransmitting from the radar beacon on each craft at its periodic receiving rate and in synchronism with its periodic receiving of said information.

IRVING WOLFF.

REFERENCES CITED

The following references are of record in the file of this patent:

UNITED STATES PATENTS

| Number | Name | Date |
|---|---|---|
| 2,027,527 | Hammond | Jan. 14, 1936 |
| 2,307,029 | Elm | Jan. 5, 1943 |
| 2,405,238 | Seeley | Aug. 6, 1946 |
| 2,427,220 | Luck | Sept. 9, 1947 |
| 2,433,341 | Busignies | Dec. 30, 1947 |